Nov. 26, 1963 G. K. SCHNEIDER 3,112,422

PHOTO-ELECTRIC CELL FOR THE AUTOMATIC EXPLORING OF CURVES

Filed Sept. 29, 1959 5 Sheets-Sheet 1

INVENTOR
GEBHARD K. SCHNEIDER

Nov. 26, 1963 G. K. SCHNEIDER 3,112,422

PHOTO-ELECTRIC CELL FOR THE AUTOMATIC EXPLORING OF CURVES

Filed Sept. 29, 1959 5 Sheets-Sheet 2

INVENTOR
GEBHARD K. SCHNEIDER

INVENTOR
GEBHARD K. SCHNEIDER

Nov. 26, 1963 G. K. SCHNEIDER 3,112,422

PHOTO-ELECTRIC CELL FOR THE AUTOMATIC EXPLORING OF CURVES

Filed Sept. 29, 1959 5 Sheets-Sheet 4

INVENTOR
GEBHARD K. SCHNEIDER

INVENTOR
GEBHARD K. SCHNEIDER

United States Patent Office 3,112,422

Patented Nov. 26, 1963

3,112,422

PHOTO-ELECTRIC CELL FOR THE AUTOMATIC EXPLORING OF CURVES

Gebhard K. Schneider, 33 Dorotheenstrasse, Dreieichenhain, Germany

Filed Sept. 29, 1959, Ser. No. 843,308
Claims priority, application Germany Oct. 6, 1958
7 Claims. (Cl. 313—96)

The invention relates to a photo-electric cell which, due to its construction, is in a position to automatically explore the contours of an original, irrespective whether a film, a drawing or a transparent foil is concerned.

All photo-electric cells known heretofore are imperfect in that they cannot turn around their axis so that a direct scanning is impossible. Explorations made by means of photo-electric cells are known but up to now a combination of several known devices is required for this purpose.

With the aid of the new photo-electric cell, which can turn around its middle axis by the aid of auxiliary means and follow the course of the contours, it is possible to render machines and installations working with the aid of scanning more valuable from an economic point of view or reduce the costs of explorations already made. The scanning of this invention eliminates known sources of error caused by unfavorable combination of a number of devices. With this new photo-electric cell the course of ships, airplanes etc. can be controlled in conjunction with known auxiliary means. Furthermore, course controls, as they are known in the aircraft construction and which are effected by radio beam or guide beam, can be exploited economically. It is of decisive importance that course controls effected with the new invention are not susceptible to jammers and eddy transmitters. The controls can not be deflected from the predetermined course by any alien excitation. The transmitting ratio from an original to be explored and the real distance can take any value desired by means of known gearing arrangements. For instance 1 cm. of the original may represent 1000 m., or even kilometers.

In the attached five drawings an exemplary embodiment of the invention is illustrated.

Figure 4:
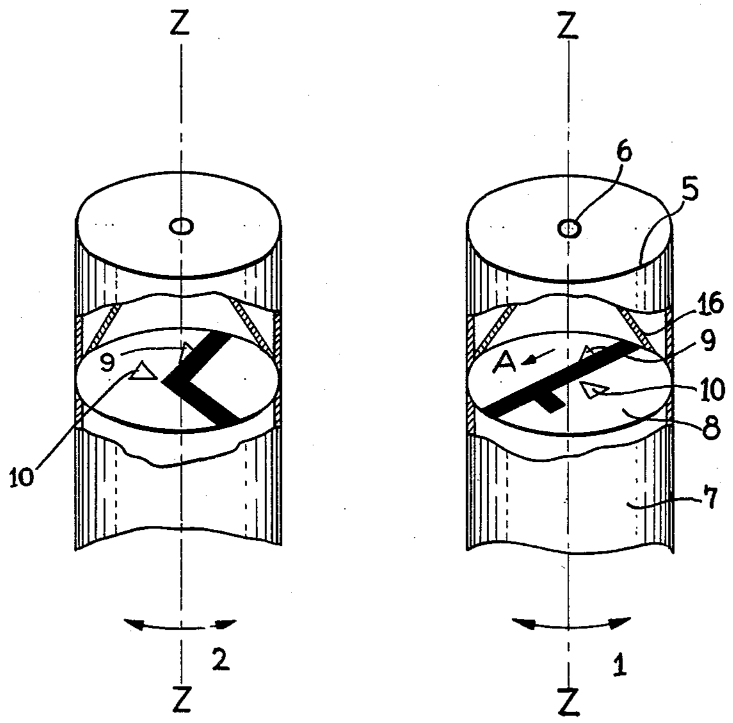

FIG. 4 shows in picture 1 the projected enlarged contour with a signal displaced by 90° which is released on the screen for initiating a certain function, which has nothing to do with the scanning, by the openings displaced by 90°. The second opening, being angularly displaced by 90° with regard to the scanning aperture, is of great importance since—along the contours of the course drawn on the original—it enables the initiation of a signal which either initiates the return of the object controlled to the same contour or which, on reaching the target, releases a desired function and then either causes the return of the object controlled or the destruction of same.

Picture 2 of FIG. 4 shows the behavior of the cell when the direction of the projected contour is changed. In the example mentioned a contour projection of 90° is shown on the screen. Owing to the aperture with which the screen is provided the cell responds immediately to any change of contour and regulates itself automatically via known controlling means.

Figure 5:
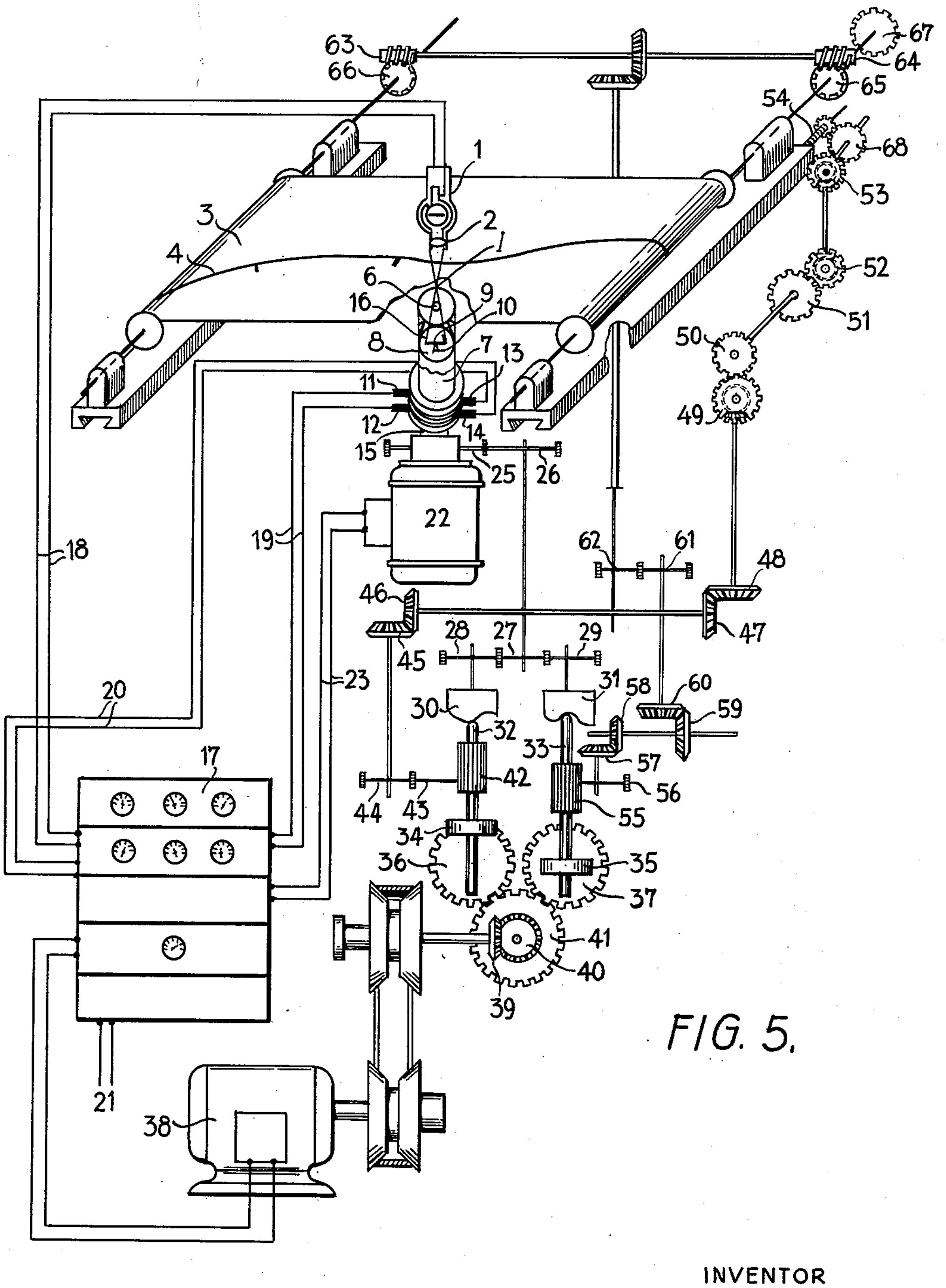

FIG. 5 shows schematically the controlling example of a machine with the new cell in connection with an amplifier, a reversible motor and a coordinate decomposer.

From lamp 1 the light is accumulated via condenser 2 and illuminates film strip 3. Said film strip 3 can also be a transparent foil. The film strip or the foil is provided with the contour 4 to be explored. When using a film, first a drawing is to be prepared with the corresponding contour which is photographically transmitted to the film. When using a transparent foil, the contour is drawn with ink and scanned directly. In case of a drawing on white paper the contour is scanned according to the reflex process.

On transilluminating film strip 3 point "I" is projected in an enlarged manner by micro-optic 6 built-in at the front side 5 of photo cell 7 on scanning diaphragm 8 which, virtually, represents a screen. Transilluminated line 3 is "dark," while the other field of the screen is "light." When using a film, the contour is "light" and the field is "dark." The photocell is provided with a photocathode mounted directly below the screen 8. For the purpose of releasing the photo effect, screen 8 is provided with openings 9 and 10 angularly displaced by 90°, which displacement is calculated from the center axis of the system Z—Z. Opening 9 touches the projected contour tangentially and is adjusted in such a way that, when film strip 3 is moved in direction II, it stands in lead. In order to make this operation fully intelligible, FIG. 4 is added showing the relation between micro-optic 6 and screen 8 with openings 9 and 10.

Arrow direction "A" means that the projected picture of the contour runs in this direction, if film strip 3 is moved correspondingly. In case contour 4 of film strip 3 shows a change of contour, for example an angle of 90°, as can be seen from picture 2 of FIG. 4, the photo' cell receiving through opening 9 the full light value is pivoted in the new direction via amplifier, reversible motor and coordinate decomposer not reproduced on the drawing.

Opening 10 is provided to cause a second signal to respond, which is displaced by 90° at the contour of the original. See picture 1 of FIG. 4.

For a straight course the photocell is adjusted in such a way that half of opening 9 stands in the range "dark" and the other half in that of "light." When the film strip with the contour is moved to "light" or "dark," the swivelling motor turns to the "right" or the "left" and always aligns the photocell in such a manner that the light value falling through opening 9 shows "½ light" and "½ dark." Upon the incidence of light opening 10 responds immediately and releases an additional signal via the provided amplifier.

The required voltage for the photocell is conducted via collecting rings 11 and 12 and 11*a* and 12*a* from the electric line, which is not shown in the drawings. Collecting rings 13 and 14 and 13*a* and 14*a* conduct the produced photocell current to the amplifier. Pivot 15 is precisely aligned both with the optical axis and the center of the photocell, and serves for an irreproachable alignment of the new photocell.

Figure 3:
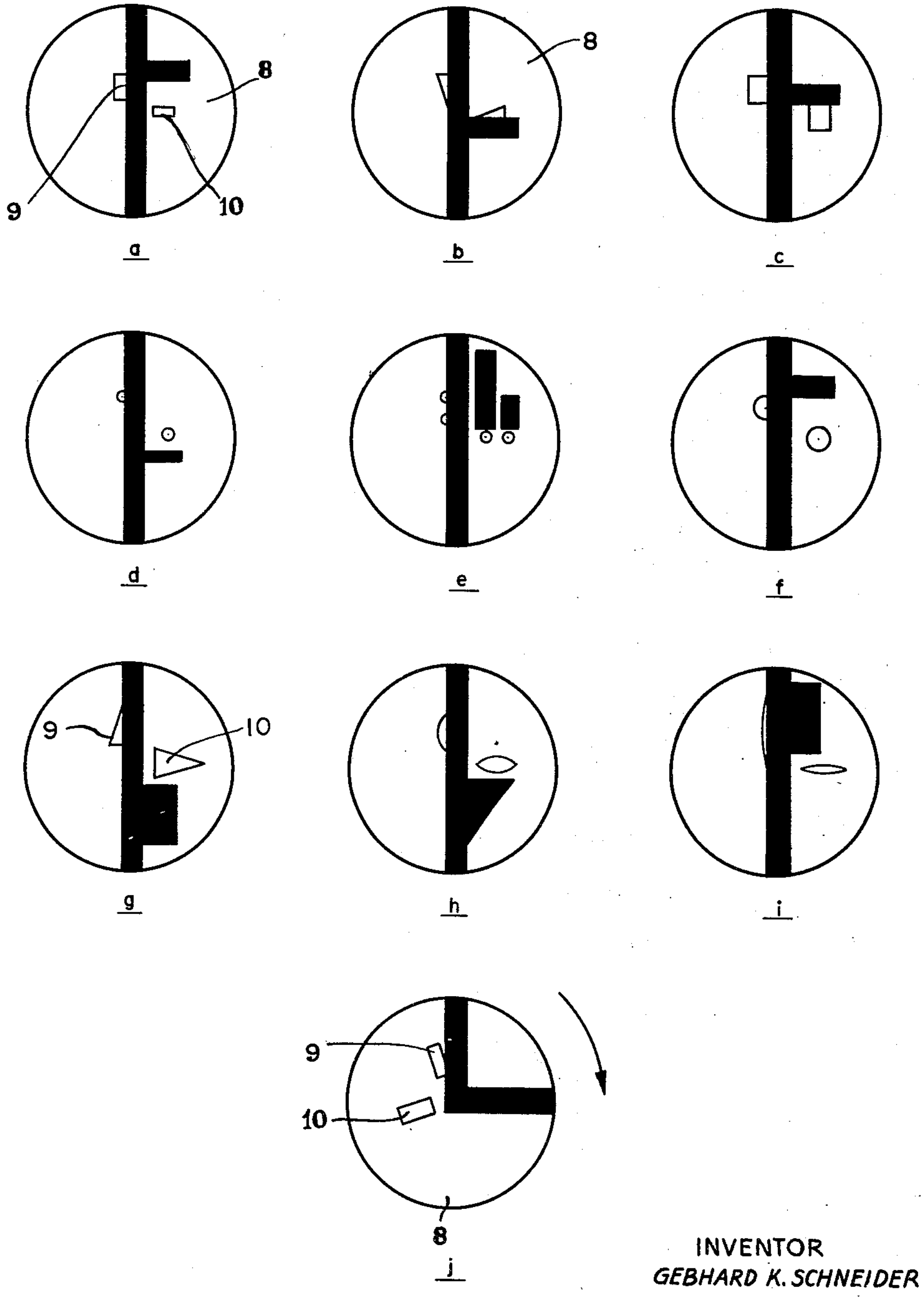
FIG. 3 shows the arrangement of the apertures of the screen being built in the cell and having differently formed openings, which enable the incidence of light. The openings being disposed from the middle of the system, are of considerable importance for the different exploration operations.

The scanning apertures of screen 8 may have differently shaped openings as is required for the scanning operations to be performed. FIG. 3 shows the corresponding projection pictures with the most different shapes of openings, which are of importance for the practical evaluation of the photocell. For the purpose of obtaining a shielding of the incident projection light on screen 8, tube 16 is to be provided for within the photocell between micro-optic 6 and screen 8.

It is the task of photo-cathodes 69 and 69*a* to convert the incident light and to pass it on as electron flow to electrodes and dynodes 70 and 70*a*. Furthermore the electron flow is conducted via leads 71 to the corresponding rings 11—14 and 11*a*—14*a*. In the head of the micro-optic cap nut 72, perforated screw 73, lock nut 74 and springy lens holder 75 serve to adjust the micro-optic.

FIG. 5 represents a controlling scheme of a machine equipt with the new photocell. From amplifier 17 receiving its current from circuit 21, lamp 1 is fed by means of circuit 18. The light rays of lamp 1 accumulated by condenser 2 transilluminate film strip 3 with contour 4. By micro-optic 6 the point transilluminated in each case is projected on the screen and simultaneously enlarged according to the magnifying ratio of micro-optic 6. For the purpose of preventing the incidence of outside light, tube 16 is built in the new photo-electric cell 7 between micro-optic 6 and screen 8.

Figure 1:
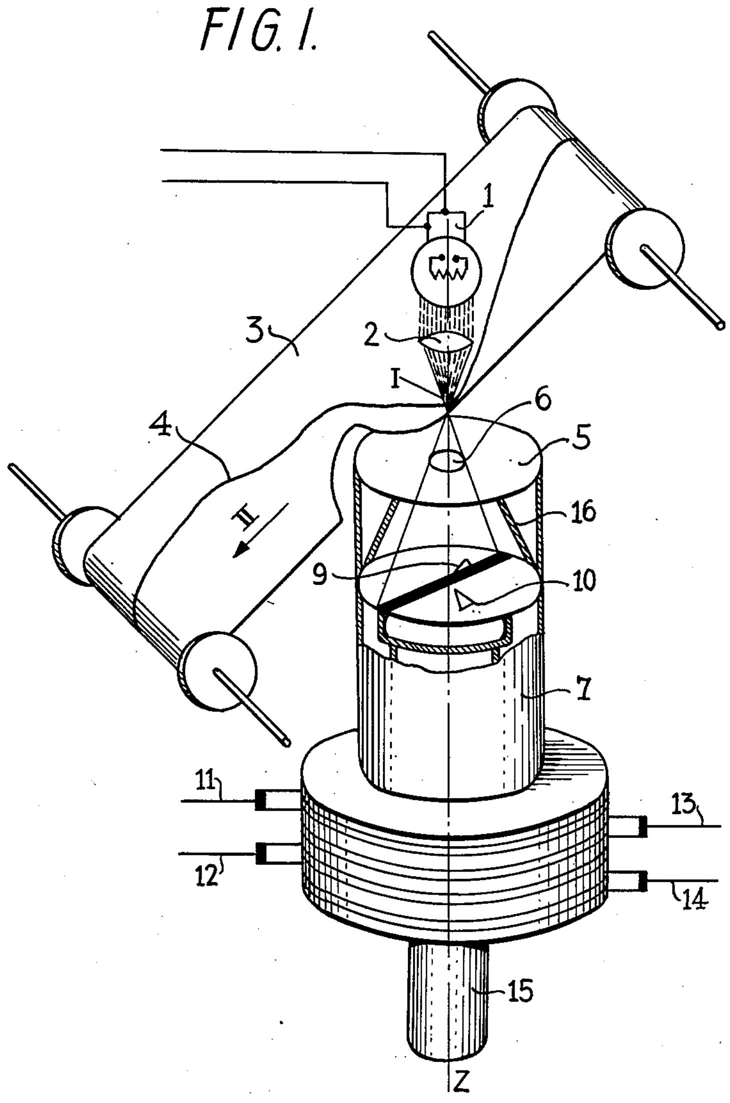
FIG. 1 shows the schematic construction of the new photo-electric cell and the initiation of the scanning operation seen from the original.
Figure 2:
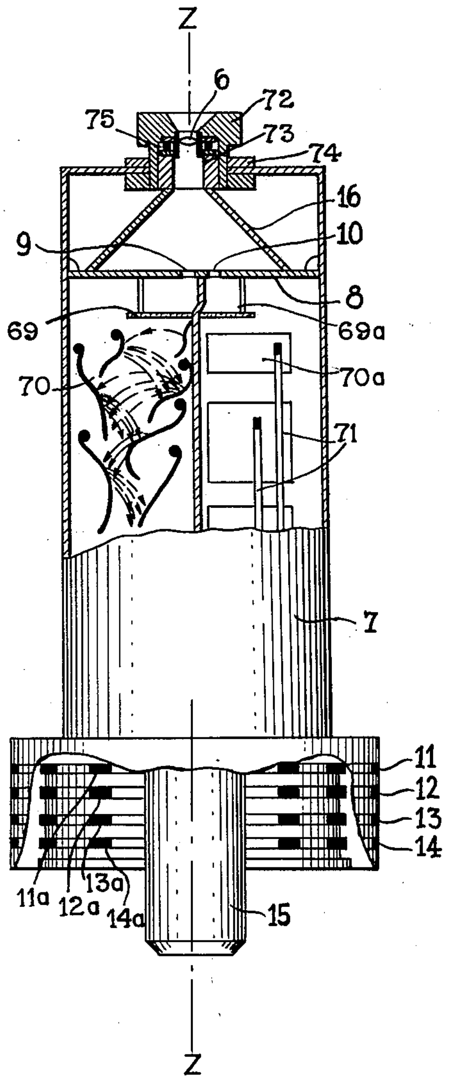
FIG. 2 shows the schematic construction of the new photo-electric cell with the optic required for magnifying the projected contours and the apertured screen.

The new cell receives a voltage via circuit 19 and collecting rings 11 and 12. The photocell current, produced by the incident light of lamp 1 and passing through openings 9 and 10 of screen 8, and striking the photocathode is conducted via line 20 to amplifier 17, where it is amplified, and then the photocell current is conducted via line 23 to reversible motor 22 for the purpose of changing the field voltage. When by moving film strip 3 with contour 4 to be explored a change of light occurs on the screen, opening 9 of FIG. 1 receives more or less light. This change provokes a modification of the field voltage at reversible motor 22, which immediately moves to the "right" or to the "left" until the middle value of the incident light is again obtained. Reversible motor 22 carries on its axis 24 new photo-electric cell 7. Axis 24 of reversible motor 22 is provided with toothed wheel 25, engaging toothed wheel 26. The shaft of toothed wheel 26 is connected at the other end with toothed wheel 27. Toothed wheel 27 is gearing into toothed wheel 28 and 29. The shafts of toothed wheels 28 and 29 are provided with cam discs 30 and 31 having exact sine curves at their front sides. On the change of direction of film original 3 with contour 4, photo-electric cell 7 receives more or less light by openings 9 and 10 disposed on screen 8, as is illustrated in FIG. 1, and said cell induces a change of direction of reversible motor 22 via amplifier 17.

Since toothed wheel 25 being mounted at the shaft of reversible motor 22 likewise joins in the changed movement, toothed wheels 28 and 29 are set in a rotative movement via toothed wheels 26 and 27. As cam discs 30 and 31 are coupled with toothed wheels 28 and 29, they take part in the initiated rotative movement. By rams 32 and 33, controlled by cam discs 30 and 31, friction wheels 34 and 35 are controlled via friction wheels 36 and 37. Friction wheels 36 and 37 are put into a rotative movement by drive motor 38 and toothed wheels 39, 40 and 41. For the "longitudinal" and "transverse" film transport the coordinates are decomposed as follows: When cam disc 30 has reached its lowest point, friction wheel 34 is at the most extreme part of the margin of friction wheel 36 and has reached its maximum speed. Cam disc 31 takes then such a position that friction wheel 35 stands exactly in the middle of friction wheel 37, while not carrying out any rotative movement. Toothed wheel 42 is fastened to friction wheel 34 and it is furthermore firmly connected with toothed wheels 43 to 53. Toothed wheel 53 is fixed on transport spindle 54 with which the transverse transport is controlled.

Friction wheel 35 is connected with toothed wheels 55, 56, 57, 58, 59, 60, 61 and 62 and controls the longitudinal transport of film strip 3 via spiral gears 63 and 64 and worm wheels 65 and 66. Worm wheel 65 is connected with toothed wheel 67, and toothed wheel 53 engages into toothed wheel 68. The movements to be controlled are taken over in the corresponding transmission ratios by means of toothed wheels 67 and 68 and thus they are utilized for the controlling operation.

Since the new photo-electric cell affords manifold uses, there is illustrated in FIG. 5 but one controlling operation to which, however, the invention is not limited.

What I claim is:

1. A photoelectric cell having a center axis and comprising at least one photo-cathode and a micro-optic built-in centrally on the center axis at its front side for magnifying an original to be explored and further comprising between the micro-optic and the photo-cathode and separated from both of them a built-in screen provided with two apertures displaced from the center axis releasing a photo effect by incident light.

2. The cell of claim 1 wherein the apertures are displaced from one another by 90°, the angular displacement of the apertures being referred to the plane of the screen at its point of intersection with the center axis.

3. The cell of claim 2 in which the incident light is protected against outside light by means of a built-in tube.

4. The cell of claim 1 containing two photo-cathodes related to the two apertures.

5. The cell of claim 1 which comprises a pivot being aranged exactly in the axis and serving as holding and alignment element.

6. The cell of claim 1 which comprises collecting rings at its socket for the purpose of absorbing the voltages.

7. The cell of claim 2 wherein the two apertures have different shape.

References Cited in the file of this patent

UNITED STATES PATENTS

| | | |
|---|---|---|
| 2,026,725 | Baker | Jan. 7, 1936 |
| 2,060,977 | De Boer | Nov. 17, 1936 |
| 2,083,995 | Henroteau | June 15, 1937 |
| 2,357,459 | Cooley | Sept. 5, 1944 |
| 2,361,581 | Whitson | Oct. 31, 1944 |
| 2,367,816 | Wyss | Jan. 23, 1945 |
| 2,404,343 | Henderson et al. | July 16, 1946 |
| 2,723,845 | Przybylski et al. | Nov. 15, 1955 |
| 2,851,643 | Limberger | Sept. 9, 1958 |
| 2,853,626 | Wetzel | Sept. 23, 1958 |
| 2,868,993 | Henry | Jan. 13, 1959 |